United States Patent

Reilly

[15] 3,645,569
[45] Feb. 29, 1972

[54] CONNECTOR FOR JOINING TUBULAR MEMBERS

[72] Inventor: Frederick W. Reilly, Toronto, Ontario, Canada

[73] Assignee: Beautiline Limited, Downsview, Ontario, Canada

[22] Filed: Sept. 4, 1970

[21] Appl. No.: 78,343

[52] U.S. Cl. .................287/54 A, 287/189.36 H, 287/126
[51] Int. Cl. .........................................................F16b 2/20
[58] Field of Search............287/20.92 C, 20, 92 D, 189.36 H, 287/54 A, 54 C, 126; 160/381; 52/656, 665

[56] References Cited

UNITED STATES PATENTS

| 3,532,369 | 10/1970 | Reilly................................287/54 A |
| 3,218,097 | 11/1965 | Bowers et al.......................287/126 X |

FOREIGN PATENTS OR APPLICATIONS

| 118,968 | 9/1944 | Australia.................................287/126 |
| 1,404,117 | 5/1965 | France....................................287/126 |

Primary Examiner—Reinaldo P. Machado
Assistant Examiner—Wayne L. Shedd
Attorney—George H. Riches

[57] ABSTRACT

An insert for use in forming a releasable locked joint between a hollow rectangular tubular member and a cubical connector which has at least two spigots of rectangular cross section. The insert fits into the tubular member and has a spigot locking portion at each corner, which bridges the corner of the tubular member to provide a void or cavity in each corner. The locked joint is established by inserting the spigot into the insert and then turning the tubular member one-eighth to bring the spigot corners into an interference fit with the spigot locking portions.

9 Claims, 6 Drawing Figures

Patented Feb. 29, 1972

Inventor
Frederick W. Reilly

Attorney

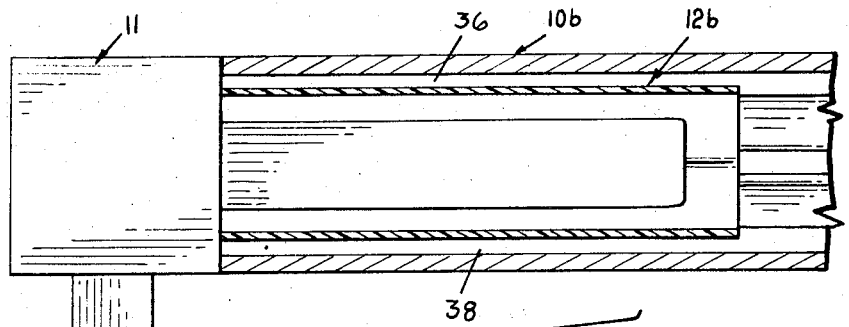
Fig.4.
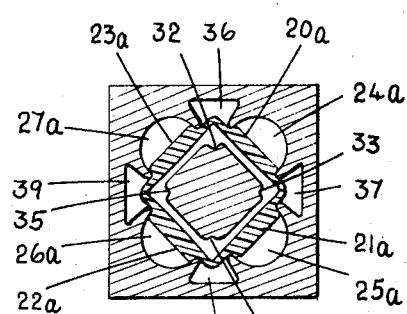
Fig.5.
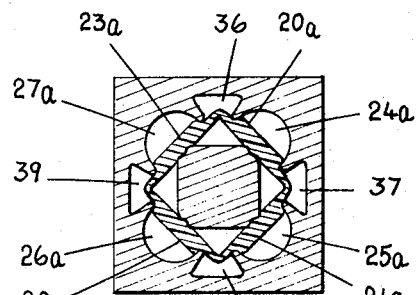
Fig.6.
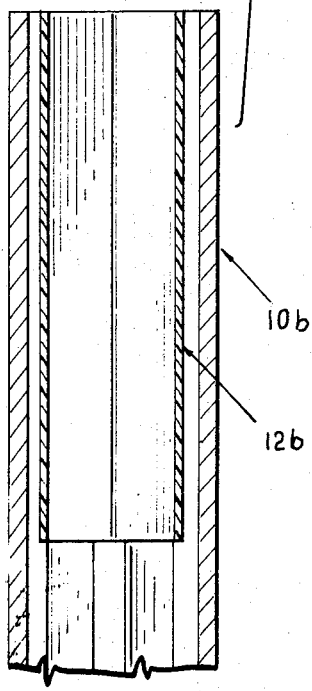
Inventor
Frederick W. Reilly
Attorney

CONNECTOR FOR JOINING TUBULAR MEMBERS

APPLICANT'S PRIOR APPLICATION

This application is an improvement on applicant's prior U.S. application Ser. No. 761,984 filed Sept. 24, 1968.

BACKGROUND OF THE INVENTION

One type of joint in which a vinyl insert is used has been disclosed in literature published by Apton, a division of Metalworks Limited. Essentially, the construction consists of a tapered vinyl insert which is inserted into a tube end. The connector consists of a plurality of tapered spigots, each of size to fit into the vinyl insert. The connection is made by hammering each spigot into the respective tapered insert.

The disadvantages of the Apton joint, having regard to the requirement for accuracy in two mating tapers, is that the joint may be too tight which will cause the tube to bulge or too loose, resulting in a loose joint, depending on minute variations in the tube dimensions. Furthermore, gaps may occur between the tube and joint. Sometimes the vinyl insert disappears into the tube when the spigot is hammered.

Canadian Pat. No. 728,354 dated Feb. 22, 1966 consists of a joint using an insert of expandable material which is inserted in the open end of a tubular member. It will be noted that the spigot is oval in cross section and that a 90° rotation is necessary to lock the joint. There are only two points of contact. This type of joint might be satisfactory for making a frame as illustrated but the joint would not be suitable for display equipment such as showcases and the like.

Applicant's U.S. application Ser. No. 761,984 discloses a joint in which hollow tubular members are joined together by a connector having a plurality of spigots, each spigot having four diametrically opposite vinyl inserts. The vinyl inserts are separately made and individually affixed in longitudinal grooves formed on the spigot. To complete the joint, the spigot, with the inserts attached, are aligned with the tube corners and then inserted; the tube is then rotated about 45° to the locked position. While this makes a satisfactory joint, it is very time consuming when assembling and also costly to manufacture. It has the further disadvantage of tending to bulge the sides of the tube.

OUTLINE OF THE INVENTION

The present invention overcomes the foregoing and other disadvantages of the prior joints by providing an improved and simplified construction wherein the joint comprises three essential components consisting of a hollow tubular member of substantially square cross section, an insert, preferably of vinyl, which fits into the tubular member and a connector having a plurality of spigots, each of which fits into its respective insert when inserted into a tubular member. Upon rotation of the tube through about 45°, the three parts are brought into a positive lock position.

The device for connecting tubular members into a unitary frame includes essentially a tubular resiliently compressible insert insertable into the open end of a tubular rigid member with a friction fit, said insert having a spigot locking portion spanning, when so fitted, each corner of the tubular member and forming therewith a cavity between each locking portion and each corner permitting deflection of the spigot locking portion, and a cubical connector having a plurality of spigots of substantially square cross section, each spigot projecting outwardly from a different face thereof, the number of spigots corresponding to the number of tubular members to be joined together by one connector, the distance across the diagonals of the spigot being greater than the distance between diametrically opposite spigot locking portions, whereby when the spigot is entered in its respective insert and rotated to bring each spigot corner edge into engagement with its respective locking portion, the spigot and tubular insert are releasably locked together.

DESCRIPTION OF THE INVENTION

The connector of the present invention will now be described with reference to the accompanying drawings which illustrate a preferred embodiment of the invention. It is to be understood, however, that this is being done by way of illustration and not as a limitation. It will be apparent that alternative constructions can be devised without departing from the essential features of the invention.

In the accompanying drawings

FIG. 4 is an exploded view illustrating an alternative construction;

FIG. 5 is a cross section through an assembled joint showing a spigot entered in the tubular insert in its first position;

FIG. 6 is a cross section similar to FIG. 5 but with the assembled parts shown in the locked position.

Figures 1, 2, 3:
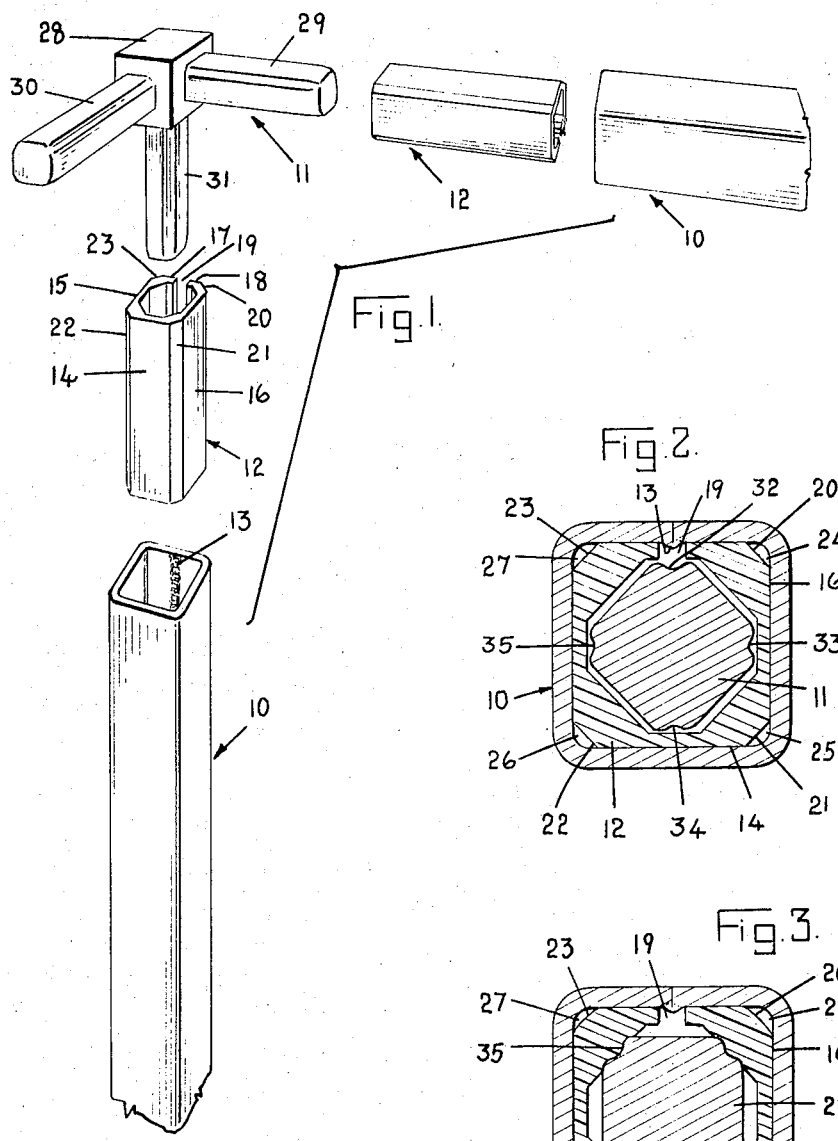
FIG. 1 is an exploded view of a joint constructed in accordance with this invention in which two tubular members are being joined together.
FIG. 2 is a cross section through an assembled joint showing a spigot entered in the tubular insert in its first position.
FIG. 3 is a cross section on the same line as FIG. 2 with the spigot and tubular member rotated relative to each other through about 45° into a locked position.

The embodiment illustrated in FIGS. 1, 2 and 3 illustrate, the invention in its simplest and preferred form. In this embodiment, the three essential elements comprise a square tubular member 10, a connector 11 and a tubular resiliently compressible sleeve 12.

The square tubular member is made of steel or aluminum and is substantially rigid. The tubing, if made of aluminum, is extruded and where a light structure is advantageous and particularly suitable to medium duty work for trolleys, showcases, small tables, etc., is usually three-quarter inch in size. If made of steel, it is made from sheet and formed into a square with the meeting ends or edges welded as shown by weld mark 13 in FIGS. 2 and 3. It is to be noted that the invention is not limited to that particular size of square tubing but the specific size is mentioned merely for the purpose of illustrating the construction and use of the present invention.

The resilient compressible tubular insert hereinafter referred to as "vinyl insert," is chosen for durability, elasticity, memory and hardness. Preferably, the vinyl insert is generally rectangular in cross section and of a size to fit inside the tubular member 10. The insert may be described as having a base 14, a pair of oppositely disposed sidewalls 15, 16 and a top wall which is separated into two parts 17, 18 by a longitudinal channel 19. The channel 19 has a twofold purpose, namely, it bridges the welded seam 13 and also permits the insert to be molded so that the sidewalls diverge outwardly, as illustrated, from the base so as to provide a position-retaining friction fit when inserted into the open end of a tubular member 10. It will thus be seen that the gap in the insert enables the shape to exert a built-in spring feature to retain the insert in its proper position.

Each longitudinal corner edge of the insert is formed with spigot locking portions 20, 21, 22, 23 which, when fitted into the tubular member 10, span each inside corner of the tubular member and forming therewith, cavities 24, 25, 26 and 27.

The drawing illustrates that the connector comprises a preferably cubical body 28 which has 3 spigots 29, 30, 31 projecting outwardly from a different face thereof. The connector which is illustrated is designed to join two horizontal tubular members 10 at right angles to each other and a vertical tubular member 10. As all spigots are identical in construction, it will only be necessary to describe the specific construction of the spigot 29. The spigot is generally rectangular in cross section and of a length about the same as the length of the insert 12. The cross section area of the spigot is slightly less than the inside dimensions of the vinyl insert 12 so that the spigot can be inserted into the vinyl insert with substantially no resistance as shown in FIG. 2. Each longitudinal edge of the spigot 29 is preferably formed with a longitudinal groove, the four grooves being indicated by the numbers 32, 33, 34 and 35. As will be pointed out later, these grooves provide a more positive lock than would be obtained without them. To obtain a smooth and easy locking and unlocking, it is preferred to modify the sharp edges along the grooves by means of a very small radius as illustrated.

The distance across the diagonals of the spigot, that is, between diametrically opposite grooves, is greater than the distance between diametrically opposite spigot-locking portions, the reasons for which will be apparent from the subsequent description which sets forth the manner of assembling the connector, insert and tubular member.

In proceeding to assemble tubular members, the first step is to insert the tubular insert into the open end of the tubular member. This is done by squeezing the insert so that it can be slid easily into the tubular member and the built-in spring feature will immediately exert an outward pressure to retain, by friction, the insert in its proper position. The spigot 29 is then inserted into the insert, in the position shown in FIG. 2. The tubular member and the spigot are then rotated about 45° relative to each other which will bring them into the position shown in FIG. 3.

It will be seen from FIG. 3 that there are four pressure points located at the four corners of the square tubular member and they are equally distant from all other points. Consequently, the pressure comes at the corners of the tubular members which will thus avoid any distortion of the walls of the tubular member. In the initial step of locking the joint together, the corners of the spigot come into contact with the spigot locking portions after a movement of about 22½°. On further rotation, the spigot corners deflect and compress the spigot locking portions and this deflection does not interfere with the tubular member since the cavities 24, 25, 26 and 27 are provided to allow the deflection without applying stress at the corners. Because of the radii along the groove edges, the twisting or turning of the spigot and the tubular member to the locked position is accomplished very smoothly from the beginning to the end of the 45° turn necessary to produce a firm lock and a very rigid joint. Since vinyl acts like rubber and will accommodate itself to small crevices, it is evident and was established by tests carried out, that the vinyl flowed into and became firmly embedded in the grooves. It is apparent that the vinyl excess finds its way into the concave wave and the pressures move into equal balance. Tests show that when turning the tube one-eighth, there is a point where everything settles into place. Surprisingly too, locking is easier than unlocking and that this is a clear gain in constructional work. Tests showed that once the spigot wave had settled into the vinyl considerably more effort was needed in untwisting to dislodge the overflow vinyl buried in the concave wave on the spigot.

Referring now to the embodiment illustrated in FIGS. 4, 5 and 6, it is first pointed out that this modification is basically the same device as illustrated in FIGS. 1, 2 and 3 but modified to adapt the insert to a tubular member made of aluminum by an extrusion process. In the following description, parts which correspond to the parts described with reference to FIGS. 1, 2 and 3 will be given the same reference numerals.

The embodiment illustrated in FIGS. 4, 5 and 6 comprise a square tubular member 10b, a connector 11 and an insert 12b.

The tubular member 10b is extruded aluminum. The interior of the hollow member 10b is shaped to provide two pairs of diagonally opposite cavities 24a, 25a, 26a, and 27a and channel grooves 36, 37, 38 and 39 which are formed in spaced relation between each pair of cavities. The grooves are provided for rigidly mounting the insert in the mouth end of the tubular members.

The insert 12b is a one-piece generally square tubular extrusion which is slid into the open end with the longitudinal edges thereof engaged in the respective grooves 36, 37, 38 and 39. It will be seen from FIGS. 4 and 5, that the walls of the insert bridge the cavities and that these walls form spigot locking portions 20a, 21a, 22a, 23a.

The connector is the same as the connector 11 previously described.

The device shown in FIGS. 4, 5 and 6 are used and performed in the same manner as previously described with relation to FIGS. 1, 2 and 3.

The embodiments of the invention in which an exclusive property or privilege is claimed are defined as follows:

1. A device for connecting tubular members into a unitary frame comprising in combination:
   a. a tubular substantially rigid member of square cross section;
   b. a tubular resiliently compressible insert fitted into an open end of the tubular rigid member with a friction fit, said insert having a spigot locking portion spanning each corner of the tubular member, and forming therewith a cavity between each locking portion and each corner permitting deflection of the spigot locking portion;
   c. and a cubical connector having a plurality of spigots of substantially square cross section, each spigot projecting outwardly from a different face thereof, the number of spigots corresponding to the number of tubular members to be joined together by one connector, the distance across the diagonals of the spigot being greater than the distance between diametrically opposite spigot locking portions, whereby when the spigot is entered in its respective insert and rotated to bring each spigot corner edge into engagement with its respective locking portion, the spigot and tubular member are releasably locked together.

2. A device according to claim 1 in which each spigot includes a longitudinal groove in each longitudinal corner edge thereof.

3. A device according to claim 2 in which the marginal edges of each groove are chamfered.

4. A device according to claim 1 in which the insert comprises a base, a pair of oppositely disposed sidewalls and a top wall divided into two parts by a channel, said walls diverging outwardly to thereby resiliently bias the sidewalls away from each other whereby a position retaining friction fit is obtained between said insert and the inner walls of the tubular member when the insert is fitted into the open end of the tubular member.

5. An insert for use in forming a releasable joint between tubular members, each member having a rectangular cross section and a cubical connector having a plurality of spigots of rectangular cross section each spigot projecting outwardly from a different face of the connector, said insert comprising:
   a. a resilient plastic tubular body having a rectangular cross section, said body being defined by a base, a pair of oppositely disposed side walls and a top wall opposed to said base, said body being adapted to fit into the open end of the tubular member with an interference fit;
   b. a spigot locking portion at each corner of the tubular body and bridging each corner of the tubular member whereby a void is provided between each tubular insert at each corner of the tubular member to thereby permit each spigot locking portion to flex during the locking of the spigot therein when said spigot is entered therein and twisted to a locking position.

6. An insert according to claim 4 in which said top wall of said insert is separated into two parts by a longitudinal channel and said sidewalls diverge outwardly from the base to thereby resiliently bias the sidewalls away from each other whereby a position retaining friction fit is obtained between said body and the inner walls of the tubular member when the insert is fitted into the open end of the tubular member.

7. A releasable joint comprising the combination of:
   a. a plurality of hollow tubular members of substantially square cross section;
   b. a cubical connector, the dimensions of each side corresponding to the square end of the tubular member, said connector having spigots of substantially square cross section, each spigot projecting outwardly from a different face thereof, the number of spigots corresponding in number to the number of tubular members to be joined by one connector, each spigot being entered in the respective end of a tubular member;

c. a resilient plastic tubular insert having a rectangular cross section, said insert being defined by a base, a pair of oppositely disposed sidewalls and a top wall opposed to said base, said insert being located in the open end of the tubular member between each spigot and the respective inner walls of the tubular member;

d. the top wall of the insert being separated into two parts by a longitudinal channel and the side walls diverging outwardly from the base resiliently biasing the sidewalls away from each other whereby a position retaining friction fit is obtained between said insert and the inner walls of the tubular member; and e. the insert having a spigot locking portion bridging each corner of the respective tubular member whereby a void is provided between each spigot-locking portion and the contiguous corner of the tubular member, said locking portions engaging with each longitudinal corner portion of the spigot when the tubular member is rotated thereinto to thereby releasably lock the spigots in a locked position.

8. A device according to claim 7 in which each spigot includes a longitudinal groove in each longitudinal corner edge thereof.

9. A device according to claim 8 in which the marginal edges of each groove are chamfered.

* * * * *